United States Patent [19]
Lee et al.

[11] Patent Number: 6,038,266
[45] Date of Patent: Mar. 14, 2000

[54] MIXED MODE ADAPTIVE ANALOG RECEIVE ARCHITECTURE FOR DATA COMMUNICATIONS

[75] Inventors: Kathleen Otis Lee, Brookline, Mass.; Robert Henry Leonowich, Temple; Ayal Shoval, Whitehall, both of Pa.

[73] Assignee: Lucent Technologies, Inc., Murray Hill, N.J.

[21] Appl. No.: 09/164,022

[22] Filed: Sep. 30, 1998

[51] Int. Cl.[7] .............................. H04L 25/06; H04L 25/10
[52] U.S. Cl. ........................ 375/317; 375/319; 375/371; 371/1
[58] Field of Search ..................................... 375/229, 332, 375/316, 354, 371, 373, 375, 376, 317, 318, 319, 346; 327/155, 156; 381/14; 455/226.1; 371/1

[56] References Cited

U.S. PATENT DOCUMENTS

| | | | |
|---|---|---|---|
| 4,635,276 | 1/1987 | Karabinis | 375/15 |
| 4,703,282 | 10/1987 | Yoshida | 329/50 |
| 4,754,169 | 6/1988 | Morris | 307/355 |
| 4,912,420 | 3/1990 | Parnell | 328/147 |
| 4,972,157 | 11/1990 | Moyal | 330/51 |
| 5,040,193 | 8/1991 | Leonowich et al. | 375/87 |
| 5,142,244 | 8/1992 | Glica et al. | 330/253 |
| 5,150,383 | 9/1992 | Misaizu et al. | 375/94 |
| 5,194,824 | 3/1993 | Wu et al. | 330/255 |
| 5,208,552 | 5/1993 | Ryat | 330/253 |
| 5,305,351 | 4/1994 | Mizoguchi | 375/222 |
| 5,311,088 | 5/1994 | Nelson | 307/520 |
| 5,406,592 | 4/1995 | Baumert | 375/376 |
| 5,539,340 | 7/1996 | Van Leeuwen et al. | 327/75 |
| 5,699,392 | 12/1997 | Dokic | 375/376 |
| 5,701,331 | 12/1997 | Hunt | 375/316 |
| 5,740,205 | 4/1998 | Baum et al. | 375/344 |
| 5,787,135 | 7/1998 | Clark | 375/376 |
| 5,790,614 | 8/1998 | Powell | 375/376 |
| 5,831,456 | 11/1998 | Sutardja | 327/100 |
| 5,856,762 | 1/1999 | Werker et al. | 331/11 |
| 5,889,435 | 3/1999 | Smith et al. | 331/1 A |
| 5,901,184 | 5/1999 | Ben-Efraim et al. | 375/344 |
| 5,909,149 | 6/1999 | Bath et al. | 331/2 |

OTHER PUBLICATIONS

U.S. application No. 08/994,862, Hirth et al., filed Dec. 19, 1997.

A 100 Mb/s BiCMOS Adaptive Pulse–Shaping Filter, Ayal Shoval, W. Martin Snelgrove, and David A. Johns, IEEE Journal on Selected Areas in Communications, vol. 13, No. 9, Dec. 1995, pp. 1692–1702.

"Continuous–TimeFilters", David A. Johns and Ken Martin, *Analog Integrated Circuit Design*, Chapter 15, pp. 574–576.

QS6611 10/100 Base TX Symbol Transceiver, Preliminary Data Sheet Rev. 3.3, Quality Semiconductor, Inc., Jul. 1996.

Capacitive Coupling and Quantized Feedback Applied to Conventional CMOS Technology, Thaddeus J. Garbara and Wilhelm C. Fischer, IEEE Journal of Solid–State Circuits, vol. 32, No. 3, Mar. 1997, pp. 419–427.

Analog Adaptive Filtering Techniques for High–Speed Data Communications, Ayal Shoval, A thesis submitted in conformity with the requirements for the Degree of Doctor of Philosophy, Graduate Department of Electrical and Computer Engineering, University of Toronto, 1995.

Median–Based Offset Cancellation Circuit Technique, Ayal Shoval, David A. Johns and W. Martin Snelgrove, 1992 IEEE, pp. 2033–2036.

*Primary Examiner*—Chi H. Pham
*Assistant Examiner*—Bryan Webster
*Attorney, Agent, or Firm*—Synnestvedt & Lechner LLP

[57] ABSTRACT

The invention is a receiver front end for a data communications system having adaptive correction for intersymbol interference, DC offset, baseline wander, and flat loss and related method. Each of the compensation circuits is adaptive and is controlled by adaptation logic via a digital feedback loop including a digital integrator for providing perfect or near-perfect integration of the adaptation algorithm feedback error signal. The architecture further utilizes multiple comparators, including continuous-time and clocked comparators, for separately detecting various aspects of the received data signals that are used to determine the signal degradation characteristics needed to generate error signals for the adaptation feedback loops.

28 Claims, 2 Drawing Sheets

MIXED MODE ADAPTIVE ANALOG RECEIVE ARCHITECTURE FOR DATA COMMUNICATIONS

FIELD OF THE INVENTION

The invention pertains to data communications, and particularly, data communications over a wire connection. More specifically, the invention pertains to a receive architecture for a data communications system with correction for signal degradation.

BACKGROUND OF THE INVENTION

Data communication refers to the transmission of information over a medium. The medium, for instance, may be air (e.g., wireless or radio communications systems), fiber (e.g., fiber optic communications networks), or copper (e.g., wire conductor communication systems). The data communicated may be either digital (including pure digital and an analog representation of a digital code) or analog. The present invention is particularly directed toward a method and apparatus for correcting for signal degradation over a wire connection between a transmitting and receiving station of a digital data communications system. However, the invention is broader in concept and can be applied to various other types of data communication systems.

Data transmission over wire involves a transmitter station connected to a receiver station via a link (copper cable) of arbitrary length. Typically, digital information is transmitted as a series of pulses. One typical digital communications scheme is to represent a digital one with a pulse of a specified duration and specified amplitude and a digital zero with the absence of such a pulse in a designated time slot. An exemplary system might use a 3 millisecond pulse of 1 volt and/or −1 volt amplitude to represent a digital one. A digital zero might be represented by 0 volts for the same duration.

The front end of the receiver station includes apparatus, such as a phase-locked loop, for synchronizing to the data rate and phase of the incoming signal. Thus, the receiver can synchronize its clock to the incoming data so as to detect the signal level at proper instances relative to the time slot assignments of the incoming data signal. The receiver station, of course, typically also includes apparatus for decoding the incoming digital signal and using the received data for its intended purpose.

In order to maximize data throughput (the amount of information that can be sent in a given time period) and hence achieve faster data transmission speed, the pulses are packed as tightly as possible, i.e., the durations of the pulses are made shorter and the rising and falling edges are made sharper.

As is well known, the rising and falling edges of a pulse comprise a plurality of integer multiples of a base frequency sine wave of the same amplitude. The sharper the edge, the larger the number of frequencies comprising the signal. Therefore, as the rising and falling edges become sharper, the signal contains higher and higher frequency components.

However, as the frequency of a signal increases, the depth of penetration of the signal into the actual conductor, e.g., the copper, decreases. Consequently, the resistance of who the cable is greater for higher frequency signals than for lower frequency signals. This characteristic of copper wire is termed "skin effect." Due to skin effect, the attenuation of signals transmitted over a distance on a copper wire increases linearly with the square root of the signal frequency. Further, phase response increases linearly with frequency. The variable attenuation and phase response dependent on frequency thus causes the different frequency components that make up the pulses to arrive at the receiver with different amplitudes due to the variable attenuation and different delay due to the phase variation. Accordingly, the frequency components of the signal arriving at the receiver do not accurately represent the digital signal that was originally transmitted by the transmitter station.

The result is distorted pulses which spread out. If the spreading is significant enough, it can cause adjacent symbols (pulses) to overlap and interfere with each other. This type of signal degradation and interference is known as intersymbol interference or ISI. If the degradation is significant enough, the pulses and, thus the information contained in the signal, cannot be deciphered by the receiver station.

Accordingly, various methods and apparatus have been devised for correcting such signal degradation. The process of correcting for ISI is termed equalization. Equalization involves passing the received signal through circuitry that compensates for the attenuation and phase distortion induced by the medium and, thus, in theory at least, restores the signal to its original, transmitted, form. This type of equalization is termed inverting the channel response because the goal of the equalization is to modify the received signal by the inverse of the attenuation and phase responses of the wire. Another known solution is to shape the incoming pulses to a known response, one that may still retain ISI, rather than completely inverting the channel response.

Transmission of data over a wire connection also involves what is known as ohmic losses. Particularly, any signal transmitted over a wire attenuates over distance. Ohmic loss affects all frequencies equally and is thus termed flat loss. The greater the distance, the greater the ohmic loss or attenuation. Correction for ohmic loss typically involves the use of gain control circuitry.

Another feature of wire data communications systems is the need to electrically isolate the receiver and the transmitter from each other since they may be at different ground potentials, particularly if they are geographically distant from each other. Accordingly, receiver stations and transmitter stations typically are isolated from the transmission medium, i.e., the wire, by some mechanism. The typical isolation mechanism is the use of an isolation transformer between each communication station (receiver or transmitter) and the wire. However, an undesirable side effect of an isolation transformer is it induces a low frequency pole that rejects the low frequency components of transmitted pulses. This effect is another form of signal degradation in the wire communications. The low frequency rejection characteristics of transformers also can cause direct loss of data. For instance, a long string of consecutive digital is essentially is a low frequency analog signal which could be rejected by the transformer. To mitigate this undesirable side effect of isolation transformers, it is possible to ensure that the transmitted pulses do not contain any low frequency components. However, some line codes do and will comprise some low frequency components. If a line code (transmit pulse sequence) does contain low frequency tones, the transformer causes a low frequency disturbance known as baseline wander or BLW on the transmit pulse sequence that depends on the transformer and transmit pattern. As its name implies, baseline wander is an effect by which the ground voltage potential of the wire drifts from the desired potential. Baseline wander occurs when the signal being sent over the wire is not DC balanced over time and is quite common in communications systems. Thus, receiver stations may further be equipped with circuitry that compensates for the low frequency loss induced by the transformer.

From the discussion above, it can be seen that there are at least three effects that contribute to signal degradation in a wire communication system, namely, ohmic loss (which include transmit level inaccuracy, ohmic losses from the cable as well as ohmic losses of connectors and is collectively termed flat loss), base line wander, BLW, and frequency dependent degradation comprising variable attenuation and variable phase variation. These effects are a function of one or more of the (1) cable length, (2) cable composition, (3) transmitter output level inaccuracy, (4) transformer type, and (5) other environmental conditions which can vary from link to link. Error correction or compensation techniques to battle these effects therefore should be adaptive in nature, i.e., self-correcting, since many of these factors can vary from one received data link to the next.

The concept of adaptive compensation is based on the fact that the communication protocol includes intermittent known signals that can be readily identified at the receiver station. The degraded signal which is actually received can be compared with the ideal version of the known signal. The difference between the two can be determined and compensation can be applied to the signal which would exactly correct for the differences between the two signals. For instance, it may be known when to expect a particular falling edge of a pulse. It is further known that when the falling edge of a pulse crosses 0.5 volts, it should reach 0 volts a certain time thereafter, e.g., four nanoseconds. If, for instance, it takes longer than four nanoseconds to reach 0 volts, then the received signal contains ISI degradation which should be corrected.

In addition to the above-discussed effects that contribute to signal degradation, integrated circuits such as the electronics that might be found in a receiver station, are fabricated in a manufacturing process that contains certain non-idealities. Put simply, each die manufactured by a given process is not exactly identical to each other die; they contain differences due to variations in the fabrication process that cannot be controlled ideally. These process non-idealities in the receiver station circuitry lead to DC offsets which are superimposed on the incoming signal. As its name implies, DC offset results in a flat offset of the receiver station on the incoming signal. For instance, an incoming signal at what is intended to be 0 volts can be recognized at a DC level of some other voltage. The offset can be significant enough to result in the misinterpretation of digital ones as zeroes and vice versa.

FIGS. 1, 2, and 3 illustrate various techniques that have been employed in the prior art to correct for one or more of the aforementioned signal degradation effects.

For instance, FIG. 1 shows a receiver front end employing one typical adaptive equalization scheme of the prior art. As shown, an input signal received over the wire network from the transmitter station is received at input terminal 12. A comparator 16 compares the input signal with a predetermined level or levels to determine whether the signal at any given instant (within a time slot) should be interpreted as a digital 1 or a digital 0. For instance, in a communications system in which a 0 is represented by a 0 volt level for a specified duration and a digital one is represented by a 1 volt or −1 volt pulse, the comparator may compare the signal with +0.5 and −0.5 volts in order to determine whether the symbol in a time slot should be interpreted as a digital 1 or a digital 0. A timing recovery circuit 18, which may comprise a phase locked loop (PLL), recovers the timing of the signal so that the receiver station can synchronize itself to the time slot timing of the pulses of the signal. The timing recovery circuit 18 outputs the detected receive signal to further circuitry (not shown) which processes and/or uses the data for whatever the intended purpose might be. For instance, if the receiver station is a facsimile machine on a telephone communications network, the circuitry subsequent the timing recovery circuitry will translate the received pulses into an image and print the image on a sheet of paper.

The equalization circuitry for shaping the incoming data in order to correct for frequency dependent degradation comprises an adaptive equalizer 14 interposed in the receive path before the comparator and a feedback loop including an error generator circuit 20 and circuit 22 for performing an algorithm whereby an error signal is extracted from the equalizer output. Typically, equalizer block 14 comprises a filter with adjustable poles and zeros. By adjusting the poles and zeros, one can optimize the transfer response of the equalizer for any medium and hence reduce ISI. The optimization procedure requires an algorithm, generally known as the least mean square (LMS) algorithm, whereby an error signal is extracted from the equalizer output by the error generator block 20 and fed to the least mean square algorithm performing circuit 22. The LMS circuit 22 then controls the equalizer relative to the extracted error signal.

For the optimization procedure, a gradient signal for each adaptive pole and zero is required. This requirement increases circuit complexity, power dissipation and area. Thus, a more simplified architecture is desired.

FIGS. 2 and 3 show two variations of a second general type of architecture for correcting for signal degradation.

In these architectures, the equalizer poles and zeros are pre-computed over a range of possible trajectories that cover the full range of potential cable variations. The concept of this design is to form a programmable equalizer with N possible transfer functions. A feedback circuit is used to select one of the N possible transfer functions in an adaptive fashion based on the characteristics of the signal received at input terminal 12. In operation, an error signal from the output of the equalizer 32 is generated and a minimization routine is used to minimize the error signal as a function of one of the N programmed transfer functions. Also included within the circuit is a technique for compensating for baseline wander.

Referring first to FIG. 2, the receive signal is input to the adaptive equalizer 32. The comparator 16 and timing recovery 18 circuits are essentially identical to those discussed above in connection with FIG. 1. A low pass filter 36 is coupled in a loop around the comparator 16 and a high pass filter 34 is added between the equalizer 32 and the comparator 16. A summing circuit 44 sums the output of the low pass filter 36 and the high pass filter 34 before forwarding it to the input of the comparator. The high pass filter 34 rejects the low frequency components of the transmit pulse sequence. This induces baseline wander as previously explained. The low pass filter 36 then recreates the low frequency components from the equalized output and the two components are summed together by summer circuit 44 to recreate the full signal. This is known as a quantized-feedback technique.

With respect to equalization, the output of the equalizer 32 is fed back to control the equalizer through a peak detection circuit 38. The peak detector 38 essentially is a comparator which compares the feedback signal with a reference signal, the reference signal being the expected peak level. For instance, in the example which we have been using, the peak level is 1 volt or −1 volt. The peak detection circuit 38 computes the peak value $L_\infty$ norm of the equalizer output, compares that value to an expected value, and generates an output signal to adjust the equalizer until the difference (i.e., the error signal) is minimized.

A second low pass filter 40 (LPFT) is used to average the error signal over several pulses of the input sequence.

One drawback of the system of FIG. 2 is the use of the analog low pass filter 40. Particularly, an analog low pass filter implements an integrator that is leaky (non-ideal). Further, an active integrator suffers from DC offset, which degrades the optimization algorithm. Peak detection implementations are less than optimum because they cannot segregate out flat loss. Other options for peak detector circuit 38 are peak tracking, average value tracking ($L_1$ norm) or power estimation ($L_2$ norm). However, these approaches also do not differentiate between ISI and flat loss (which is further complicated in the presence of baseline wander). Hence, optimal equalization cannot be achieved in the absence of an accurate transmit amplitude and a known channel flat loss. These requirements are seldom achievable.

There are two potential locations for placing the high pass and low pass filters 34 and 36, respectively. The first option is as shown in FIG. 2 and discussed above. FIG. 3 shows a second option. In the FIG. 2 embodiment, the high pass filter 34 is placed between the equalizer 32 and the comparator 16 and the low pass filter 36 is in a feedback loop around the comparator 16. The summing circuit is positioned before the comparator and within the feedback loop. The low pass filter 36 and the high pass filter 34 typically are implemented such that they have the same pole frequency (i.e., the same time constant). The pole frequency typically is selected to be the same or higher as the low frequency pole of the transformer of the receiver station (not shown). However, depending on the cable length, the effective pole frequency of the transmit and the receive transformer combination can vary. Consequently, typical quantized-feedback techniques are effective only over a limited cable length variation and, in fact, can deteriorate overall performance at cable lengths outside the range for which it is effective. Thus, optimum baseline wander correction is unattainable with typical non-adaptive quantized-feedback baseline wander correction circuit techniques.

A drawback of the system of FIG. 2 is that an effect of baseline wander is an increase in the possible range of the signal envelope. This requires that the equalizer 32 operate over a wider dynamic range. Since this is not always possible to accomplish, the incoming signal must be attenuated to decrease its dynamic range within a range that can be handled by the equalizer 32. This can result in performance degradation because the signal to noise ratio may increase as the signal power is decreased.

The FIG. 3 embodiment of this technique eliminates this problem. In this embodiment, the high pass filter is placed before the equalizer circuit 32 and the feedback loop of the low pass filter 36 includes the equalizer. The advantage of this embodiment is that the baseline wander effect is corrected by the combination of the high pass filter 34, low pass filter 36 and summer 44 before the signal passes through the equalizer 32. Thus, in this embodiment, the dynamic range of the signal is corrected and reduced prior to passing through the equalizer 32. However, a drawback of this embodiment is that the effectiveness of the DC restoration (the correction of baseline wander) is sensitive to channel flat loss, which is an unknown. Also, the quantized feedback in the low pass filter loop portion of the baseline wander correction scheme of either the FIG. 2 or FIG. 3 embodiment is a positive feedback system. Hence, it is possible for the system to become unstable.

SUMMARY OF THE INVENTION

The present invention is a receive station architecture and associated method for a data communications system which contains circuitry for adaptively compensating for gain variation, intersymbol interference, baseline wander, flat loss, and DC offset.

In accordance with the present invention the incoming signal, after being altered by a series of adaptive compensation circuits, is detected by a continuous-time comparator. The output of the continuous-time comparator is fed to a timing recovery circuit to capture the incoming signal timing. The output of the timing recovery circuit is the data output of the receiver front end. In a preferred embodiment the receive signal is also forwarded to at least one and preferably at least three clocked comparators. Each comparator is clocked to detect a specified instant of the signal. The outputs of the continuous-time comparator as well as each of the clocked comparators are forwarded to an adaptation logic block. This block takes the selected signal portions, determines whether the transfer functions of any of the adaptive correction circuits should be modified based on the detected events and then controls those circuits accordingly. The adaptive correction circuits in the data path include an equalizer, an automatic gain control circuit, a high pass and low pass filter combination for baseline wander correction, and a DC offset correction circuit. Each of the correction circuits is controlled separately and distinctly from the others by the adaptation logic.

Also in a preferred embodiment, each feedback path includes, between the adaptation logic and the corresponding adaptive compensation circuit, a digital integrator comprising an up/down counter followed by a digital-to-analog converter. These circuits comprise essentially a digital integrator which does not suffer from offset and essentially comprises a perfect integrator.

DETAILED DESCRIPTION OF THE INVENTION

Figure 1:
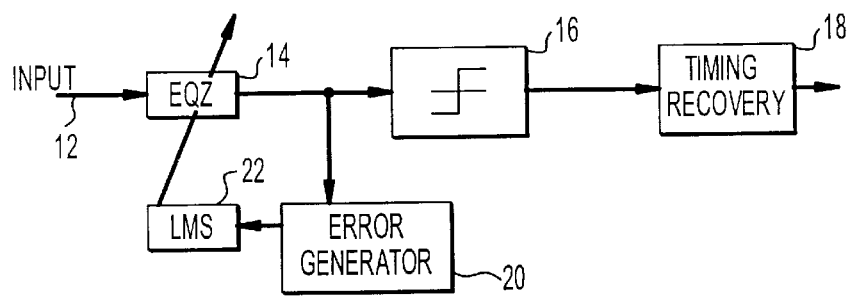
FIG. 1 is a block diagram of the front end of a receiver station having an equalization feedback loop in accordance with the prior art.
Figure 2:
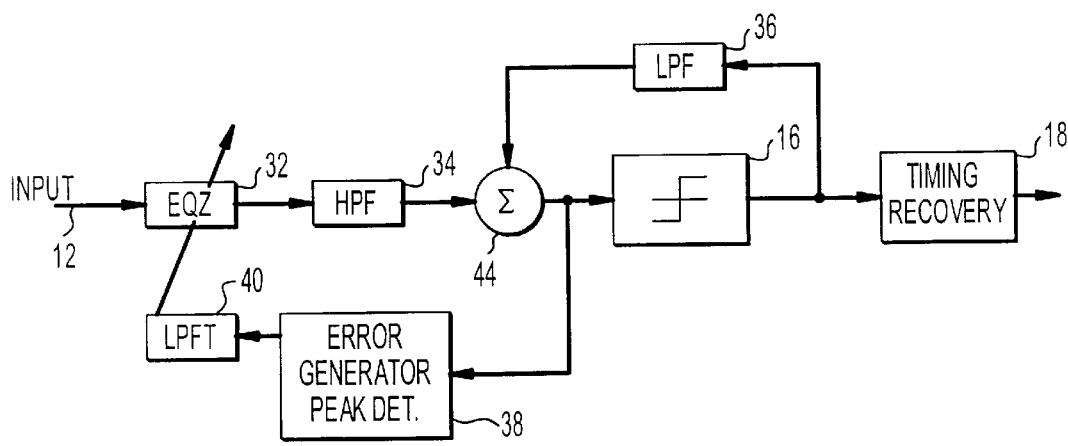
FIG. 2 is a block diagram of the front end of a receiver station having an adaptive equalizer with baseline wander compensation of the prior art in accordance with a first embodiment.
Figure 3:
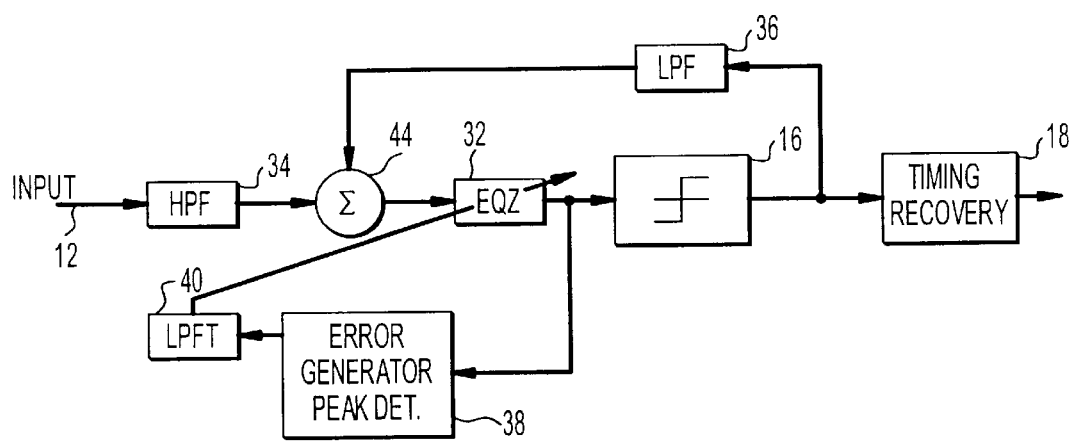
FIG. 3 is a block diagram of the front end of a receiver station having an adaptive equalizer with baseline wander compensation of the prior art in accordance with a second embodiment.
Figure 4:
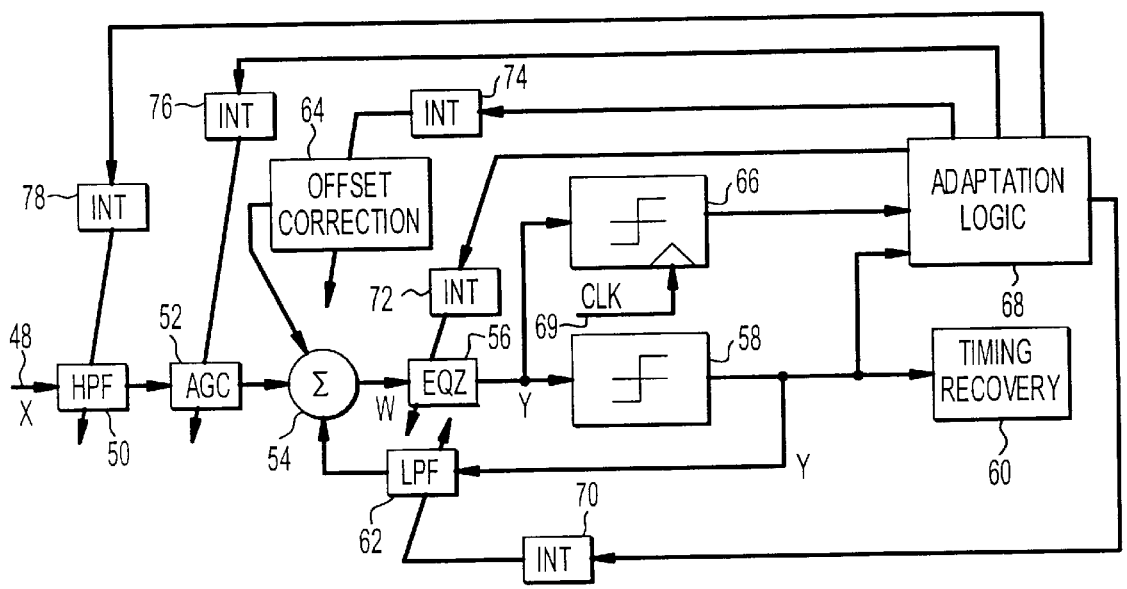
FIG. 4 is a block diagram of the front end of a receiver station having signal degradation correction in accordance with the present invention.

One preferred embodiment of the front end of a receiver station architecture of the present invention is shown in block diagram form in FIG. 4. The data path of the receiver front end comprises blocks 50, 52, 54, 56, 58 and 60. As in the prior art, the comparator 58 detects whether the value in each time slot of the incoming data signal represents a digital 1 or digital 0 and the timing recovery circuit 60 captures the timing of the incoming signal so as to synchronize the receiver station to the incoming data signal. Further, the timing recovery circuit outputs the data to further circuitry for decoding and use. The remaining blocks in the direct data path, blocks 50, 52, 54, and 56 are adaptive correction circuits.

The high pass filter 50 is the first adaptive compensation circuit in the data path. It works in conjunction with the low pass filter 62 in a quantized feedback technique to correct for baseline wander as will be described in more detail below. The automatic gain control (AGC) circuit 52 is an adaptive correction circuit which corrects for flat loss.

Summation circuit 54 adds the data signal (after it has passed through the high pass filter 50 and the AGC circuit 52 to the output of the comparator after it has passed through the low pass filter 62. The summation of these two signals corrects for the baseline wander effect, as previously mentioned. The summation circuit also adds in the output of the offset correction circuit 64. The offset correction circuit 64 corrects for the DC offset that results from fabrication process non-idealities as well as the effects of the positive feedback of the quantized feedback circuitry for baseline wander compensation which could otherwise lead to instability. The output of summation circuit 54 is forwarded to the input of the equalization circuit 56. As previously described, the equalization circuit corrects for frequency dependent phase variation frequency dependent amplitude attenuation of the data signal, i.e., intersymbol interference (ISI).

The remainder of the circuitry shown in FIG. 4 comprises five separate feedback paths for controlling the various adaptive compensation circuits, namely, AGC 52, offset correction circuit 64, equalizer 56, and baseline wander correction circuit components 50 (high pass filter) and 62 (low pass filter).

Thus, the method and apparatus includes five separate circuit components for correcting four signal degradation characteristics. Particularly, the high pass filter 50 and low pass filter 62 together compensate for baseline wander. As can be seen in FIG. 4, this compensation is performed and added to the data signal by summation circuit 54 before the equalization circuit 56. Accordingly, the dynamic range of the equalization circuit does not need to be expanded to accommodate the wider dynamic range that is inherent in the data signal in the absence of preceding baseline wander compensation.

The AGC circuit 52 corrects for flat loss, i.e., amplitude attenuation that is flat over all frequencies. Next, the equalizer 56 corrects for frequency dependent phase and amplitude variation. Finally, the offset correction circuit 64 corrects for DC offset due to fabrication process non-idealities.

The feedback loops and associated circuitry for adaptively controlling each of the adaptive compensation circuits will now be described. In the terminology of this application, the symbol U denotes the signal which was actually sent from the transmitter prior to any signal degradation; the symbol X represents the signal that is received at the input terminal 48 of the receiver station; the symbol W represents the output of the summation circuit (which is also the input to the equalization circuit); the symbol Y represents the output of the equalization circuit/input to the comparator and is the fully corrected receive data signal; the symbol $\hat{Y}$ denotes the output of the continuous-time comparator which is the feedback signal to the analog low pass filter 62 as well as the digital data output signal to the timing recovery circuit 60 and therethrough to the remainder of the receiver station circuitry (not shown).

In a preferred embodiment, the receiver station front end includes, in addition to the continuous-time comparator 58, at least one clocked comparator 66. In a preferred embodiment, there are three separate clocked comparators clocked to sample three different instants in the time slot of a data symbol. The output of the clocked comparators 66 as well as the continuous-time comparator 58 are forwarded to an adaptation logic block 68.

Figure 5:
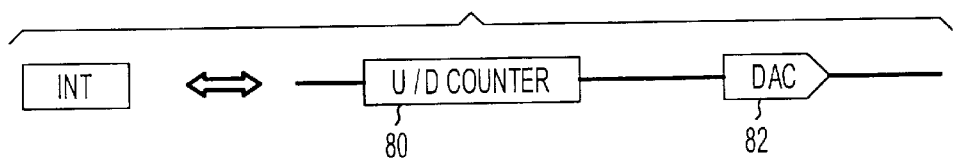
FIG. 5 is a block diagram of the digital integrators shown in FIG. 4.

The adaptation logic block 68 comprises circuitry and/or software for determining from the comparator outputs whether the various adaptive compensation circuits are providing appropriate compensation, and controlling the adaptive compensation circuits through the various feedback loops to provide the most ideal compensation for signal degradation. The adaptation logic block 68 and feedback paths are described in detail in U.S. patent application Ser. No. 08/994,862 entitled Adapting Equalization Gain and Offset for Data Transmission, which is incorporated herein by reference. Further, the clock generator of clock signal(s) 69 for sampling the receive data signal at the appropriate instants is described in detail in U.S. application Ser. No. 09/021,329 entitled Asynchronous Clock for Adaptive Equalization, filed Feb. 10, 1998 and also incorporated herein by reference. Reference should be made to these two documents for a more detailed description of the circuitry and operation of the adaptation logic, feedback loops and various adaptive compensation circuits. In short, each of the five feedback loops comprises, between the adaptation logic 68 and the corresponding adaptive compensation circuit 50, 52, 56, 62 or 64, a digital integrator 70, 72 74, 76, 78, respectively. A block diagram of the digital integrators is shown in FIG. 5. Each filter includes an up/down counter 80 followed by a digital-to-analog converter 82. The output of the digital integrator is the signal which directly controls the corresponding adaptive compensation circuit.

The digital-to-analog converters 82 in the digital integrators 70, 72, 74, 76, 78 can be low performance circuits, i.e., they need not have high speed or high accuracy in order to provide adequate performance in their specific roles, namely to tune DC bias voltage. Accordingly, in a preferred embodiment, these digital-to-analog converters are synthesized to modest performance characteristics in order to minimize power consumption and die area. One preferred embodiment of these digital-to-analog converters is disclosed in U.S. patent application Ser. No. 09/038,423 entitled Differential Resistor-String Digital-to-Analog Converter, filed Mar. 11, 1998 and incorporated herein by reference.

In a preferred embodiment of the invention, in order to avoid excessive adjustment of the adaptive compensation circuits, the counter 80 does not alter its output value to the DAC responsive to every pulse from the adaptation logic. Rather, it maintains a running count of the error signals generated for the relevant events. Thus, when the adaptation logic 68 issues an adjustment pulse of appropriate polarity (indicating the direction of the necessary adjustment), the counter does not necessarily change its output to the DAC. Rather, it is only after the running count maintained by the counter reaches a specified value that the counter increments or decrements its output.

Thus, for instance, if, the running counter within the counter 80 is presently at a value of zero and the next six events indicate, respectively, that equalization should be (1) increased, (2) decreased, (3) decreased, (4) decreased, (5) increased and (6) increased, the running count value will be one after the first event, zero after the second event, negative one after the third event, negative two after the fourth event, negative one after the fifth event, and zero after the sixth event. If the system required, for instance that the running count reach negative five before the output of the counter be decremented and that the running count reach a value of positive five before the output of the counter be incremented, then the output of the counter would not have changed over the course of these six events. In essence, the error signals are averaged over time.

The generation of an adjustment pulse on a feedback path will cause the corresponding up/down counter 80 of the digital integrator to either increment or decrement depending on pulse polarity. For instance, if it is determined that the offset correction provided by offset correction circuit 64 is too great, the adaptation logic 68 will send out a count down pulse to digital integrator 74. On the other hand, if the DC offset correction is too low, the adaptation logic will send out a count up pulse to integrator 74. The corresponding up/down counter will then either increment or decrement, accordingly. The output of the up/down counter is passed through a digital-to-analog converter (DAC) 82 and the output signal level of the DAC is sent to the offset correction circuit 64. In response, the offset correction circuit 64 will increase or decrease its offset correction depending on whether the output of the digital-to-analog converter 82 of digital integrator 74 was increased or decreased. All of the other adaptive compensation circuits are controlled through similar digital integrators in an analogous manner.

One of the advantages of separate clocked and continuous time comparators is to isolate the timing recovery from the adaptation loop. Receivers normally extract the clock from the timing recovery circuit and use it to clock the comparators. However, if the clock is not recovered accurately, then the comparators are not clocked with the correct timing. This means that the architecture is not making the correct decisions for generating compensation signals. Accordingly, the equalization never adapts correctly and thus the input to the timing recovery is not reliable. Thus, one ends up in a catch 22 situation in which the clock timing cannot be captured accurately.

Figure 6:
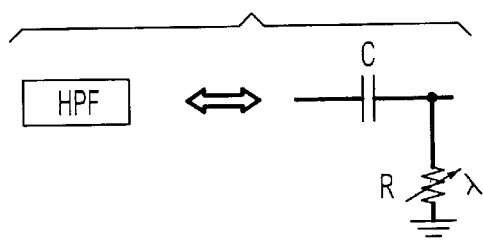
FIG. 6 is a circuit diagram of the analog high pass filter of FIG. 4 in accordance with one preferred embodiment of the invention.
Figure 7:
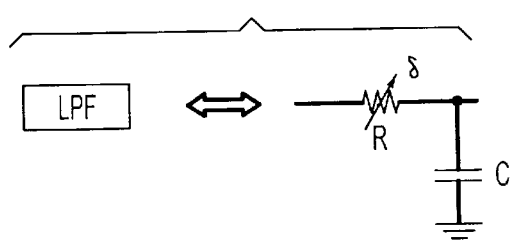
FIG. 7 is a circuit diagram of the analog low pass filter of FIG. 4 in accordance with one preferred embodiment of the invention.

In a preferred embodiment of the invention, the continuous-time high pass filter 50 and integrator 62 that collectively carry out the base line wander correction are simple RC circuits with variable time constants (poles). FIGS. 6 and 7, respectively, show preferred embodiments of the high pass and low pass filters. As can be seen, they are simple RC circuits in which the time constants are adjustable via a variable resistor controlled by the output of the corresponding digital integrator 78 and 70, respectively.

In essence, the present invention utilizes a combination of continuous-time and clocked comparators to detect various events in the incoming receive signal. The continuous-time comparator detects certain transitions in the incoming data pattern. The clocked comparators sample the data pattern at intervals which are multiples of the bit rate and displaced from the transitions detected by the continuous-time comparators. The outputs of these clocked comparators at these intervals are sent to the adaptation logic which compares the outputs to the expected outputs to obtain error signals which are needed to adapt the equalizer, AGC, BLW, and DC offset correction circuits independently of each other.

By using a combination of the clocked and continuous-time comparator outputs, it is possible to obtain information regarding the amount of intersymbol interference on the receive data signal independent of flat loss, whereas simple peak detection cannot decipher between intersymbol interference, flat loss and baseline wander. Similarly, in accordance with the present invention, the clocked comparators provide information disclosing flat loss independent of intersymbol interference. That information is used to independently control the AGC circuit to correct for flat loss.

The statistics used by the continuous and clocked comparators to generate the error signals required by the adaptation algorithm as well as the implementation of the adaptation algorithm are explained in aforementioned U.S. patent application Ser. No. 08/994,862.

The AGC circuit 52 combined with the BLW correction circuitry 50 and 62 achieves more effective restoration relative to previously known techniques. It also provides a method for pre-equalizing the received data sequence. Particularly, when the adaptation algorithm stabilizes, we expect that the receive channel output Y is a recreation of the transmit data sequence U. Given this assumption, the fully corrected output signal Y to the comparators is given by:

$$Y = \frac{\alpha}{\beta} \frac{s\lambda Rc}{1 + s\lambda Rc} u + \frac{1}{1 + s\delta Rc}$$

where $\alpha$ is the AGC parameter $\beta$ is channel flat loss, $\lambda$ is the adaptive parameter in the analog high pass filter 50 and $\delta$ is the adaptive parameter in the analog low pass filter 62.

Normally, one would require the conditions $\alpha=\beta$ and $\lambda=\delta$ to ensure that Y=U. However, in systems that suffer from flat loss, but an AGC is not placed in the analog high pass filter signal path, the condition $\alpha=\beta$ cannot be achieved. Consequently, optimal baseline wander correction over a variety of cable lengths and transformer designs cannot be realized. Notice that, by tuning the AGC parameter $\alpha$, one can achieve a lead network if $\alpha/\beta$ is greater than 1 or a lag network if $\alpha/\beta$ is less than 1. This feature has been noted to be beneficial at long cable lengths. Specifically, the present invention allows pre-equalization of the data signal (i.e., equalization before the main equalizer 56) and hence a more optimal adaptive receiver for different cable lengths. That is, low frequency phase equalization can be accomplished by adjusting $\alpha$ and $\lambda$, as required for different cable lengths.

Further, because there is positive feedback due to the quantized feedback low pass filter loop in the system disclosed in FIG. 4, there is a potential for the system signal to drift and/or the system to become unstable. However, the DC offset correction circuit path can be used to prevent instability as well as correct for DC offset.

In at least one preferred embodiment of the invention, the analog low pass filter 62 may have a fixed time constant (i.e., it is not adaptive) while maintaining highly accurate performance.

In summary, in accordance with the present invention, essentially all signal path processing circuits are adaptive. Further, extremely high performance is provided by allowing the entire circuit to remain primarily analog and therefore there is no quantization inaccuracy. Yet, the adaptive feedback loops are digital, each including a digital integrator that is not leaky and is immune to introducing integrator offset error within the adaptive feedback system. The architecture independently adapts an automatic gain control circuit, an equalizer, a baseline wander correction circuit, and an offset correction circuit and thus adaptively corrects for ISI (skin effect), flat loss, baseline wander and DC offset. The DC offset correction circuitry in accordance with the present invention further will prevent the system from becoming unstable, which might otherwise occur because of the positive feedback loops in the system. Even further, the system embodies a method for phase pre-equalization (at low frequency) by adaptation of the AGC a parameter and high pass filter λ parameter.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed:

1. A receiver for receiving data transmitted over a medium, said receiver comprising:

an input terminal for receiving a data signal from said medium;

at least one compensation circuit in a path of said data signal for compensating said signal for degradation of said data signal, and outputting a compensated data signal;

an adaptation circuit coupled to receive said compensated data signal, said adaptation circuit determining a characteristic of said degradation of said data signal and generating a signal indicating at least a direction of an error between the actual compensation provided by said at least one compensation circuit and a desired compensation; and a feedback loop coupled between said adaptation circuit and said at least one compensation circuit for controlling a transfer function of said compensation circuit responsive to said error signal, said feedback loop including a digital integrator, wherein said digital integrator comprises an up/down counter followed by a digital-to-analog converter.

2. A receiver as set forth in claim 1 wherein said digital integrator averages said error signal over time.

3. A receiver as set forth in claim 2 wherein said up/down counter maintains a running count of error signals received from said adaptation circuit and alters its output to said digital-to-analog filter only after said running count reaches a predetermined value.

4. A receiver as set forth in claim 1 wherein said data signal is an analog representation of a digital signal and said receiver further comprises a continuous-time comparator for detecting the digital value of said compensated data signal and at least a first clocked comparator for receiving said compensated data signal, said clocked comparator having an output coupled to said adaptation circuit, said adaptation circuit utilizing said clocked comparator output for generating said error signal.

5. A receiver as set forth in claim 4 wherein said continuous-time comparator has an output coupled to said adaptation circuit, said adaptation circuit utilizing said continuous-time comparator output for generating said error signal.

6. A receiver as set forth in claim 5 wherein said at least one clocked comparator comprises first, second, and third clocked comparators clocked to sample said compensated data signal at different instances.

7. A receiver as set forth in claim 4 wherein said at least one compensation circuit comprises an equalization circuit in a data path of said data signal, said equalization circuit compensating for intersymbol interference signal degradation.

8. A receiver as set forth in claim 7 wherein said at least one compensation circuit further comprises an adaptive gain control circuit in said data path, said gain control circuit compensating for flat loss.

9. A receiver as set forth in claim 8 wherein said at least one compensation circuit further comprises a baseline wander correction circuit, said baseline wander correction circuit comprising:

an adaptive high pass filter with an adjustable time constant, said high pass filter being coupled in said data path;

a low pass filter coupled in a feedback path around said continuous time comparator and having an input coupled to an output of said continuous time comparator and an output coupled to an input of said equalization circuit; and a summer circuit coupled in said data path for summing an output of said low pass filter with an output of said high pass filter.

10. A receiver as set forth in claim 9 wherein said high pass filter and summer are coupled in said data path before said equalization circuit.

11. A receiver as set forth in claim 10 wherein said at least one compensation circuit further comprises an adaptive offset correction circuit compensating for DC offset, said offset circuit having an input coupled to receive an error signal from said adaptation circuit and to output a DC offset correction signal to said summer, said summer further adding said DC offset correction signal to said data signal.

12. A receiver as set forth in claim 11 wherein a transfer function of each of said equalization circuit, said gain control circuit, said high pass filter, said low pass filter, and said offset correction circuit is controlled by said adaptation circuit via a feedback path from said adaptation circuit to said circuit.

13. A receiver as set forth in claim 12 wherein said adaptation circuit generates a separate error signal corresponding to each of said compensation circuits and provides said error signal to the appropriate feedback path.

14. A receiver as set forth in claim 13 wherein each of said feedback paths for controlling said compensation circuits comprises a digital integrator for averaging said corresponding error signal.

15. A method of compensating a data signal received over a medium for signal degradation, said method comprising the steps of:

receiving said data signal over said medium;

compensating said data signal for degradation;

determining a characteristic of said degradation of said data signal by comparing said compensated data signal to a standard and generating an error signal indicating at least a direction of an error between the compensated data signal and said standard;

digitally integrating said error signal to generate said adjustment signal prior to said feeding step; and feeding back an adjustment signal responsive to said error signal to adjust the compensation provided in said compensation step to bring said compensated data signal into closer conformance with said standard;

wherein said digital integrating step comprises maintaining a running count of error signals and altering said adjustment signal only after said running count reaches a predetermined value.

16. A method as set forth in claim 15 wherein said digital integrating step further comprises the step of:

converting said adjustment signal to analog form prior to said feedback step.

17. A method as set forth in claim 15 wherein said data signal is an analog representation of a digital signal, and wherein said determining step comprises the steps of:

detecting the digital value of said compensated data signal using a continuous-time comparator;

detecting the value of said compensated data signal at at least one instant in time using a clocked comparator; utilizing the value detected in said step of detecting the value of said compensated data signal for generating said error signal.

18. A method as set forth in claim 17 wherein said determining step further comprises;

utilizing the value detected in said step of detecting the digital value of said compensated data signal for generating said error signal.

19. A method as set forth in claim 18 wherein said step of detecting the value of said compensated data signal comprises detecting the value of said compensated data signal at least three instances in time using a clocked comparator.

20. A method as set forth in claim 17 wherein said step of compensating said data signal comprises:

adaptively equalizing said data signal to compensate for intersymbol interference degradation.

21. A method as set forth in claim 20 wherein said step of compensating said data signal further comprises:

adaptively controlling gain in said data path to compensate for flat loss.

22. A method as set forth in claim 21 wherein said step of compensating said data signal further comprises:

compensating said data signal for baseline wander.

23. A method as set forth in claim 22 wherein said step of compensating said data signal for baseline wander comprises:

adaptively filtering said data signal with a high pass filter with an adjustable time constant;

adaptively filtering an output of said continuous-time comparator with a low pass filter coupled in a feedback path around said continuous time comparator; and summing an output of said low pass filter with an output of said high pass filter.

24. A method as set forth in claim 23 wherein said step of compensating said data signal for baseline wander is performed prior to said adaptively equalizing step.

25. A method as set forth in claim 24 wherein said step of compensating said data signal further comprises:

adaptively compensating for DC offset.

26. A method as set forth in claim 25 wherein:

said determining step comprises generating a separate error signal for each of said steps of adaptively equalizing, adaptively controlling, compensating said data signal for baseline wander, and adaptively compensating for DC offset; and said feedback step comprises feeding back a separate adjustment signal for each of said steps of adaptively equalizing, adaptively controlling, compensating said signal for baseline wander and adaptively compensating for DC offset.

27. A receiver as set forth in claim 1 wherein said signal generated by said adaptation circuit further indicates a magnitude of said error.

28. A method as set forth in claim 15 wherein said determining and generating step comprises generating a signal that indicates both the direction and magnitude of said error.

* * * * *